(12) United States Patent
Yang et al.

(10) Patent No.: US 7,042,185 B2
(45) Date of Patent: May 9, 2006

(54) ROBOT CONTROL APPARATUS AND CONTROL METHOD THEREOF

(75) Inventors: Seung-won Yang, Seoul (KR); Phil-joo Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 11/147,171

(22) Filed: Jun. 8, 2005

(65) Prior Publication Data
US 2006/0049790 A1   Mar. 9, 2006

(30) Foreign Application Priority Data
Sep. 7, 2004   (KR) .................. 10-2004-0071259

(51) Int. Cl.
*G05B 19/416* (2006.01)
(52) U.S. Cl. .............. 318/568.18; 318/567; 318/568.1; 318/568.15; 318/573; 700/245; 700/252
(58) Field of Classification Search ............... 318/567, 318/568.1, 568.15, 568.2, 568.18, 573, 574; 700/245, 249, 252
See application file for complete search history.

(56) References Cited

U.S. PATENT DOCUMENTS 5,129,045 A * 7/1992 Stelzer et al. ............... 700/252
5,426,722 A * 6/1995 Batchelder .................. 700/245
5,434,489 A * 7/1995 Cheng et al. ........... 318/568.15
5,988,850 A * 11/1999 Kumiya ........................ 700/63
6,046,564 A   4/2000 Kim
6,140,787 A * 10/2000 Lokhorst et al. ....... 318/568.18

FOREIGN PATENT DOCUMENTS

| KR | 1993-7595 | 5/1993 |
|----|-----------|--------|
| KR | 0160699   | 8/1998 |
| KR | 10-427522 | 4/2004 |

* cited by examiner

Primary Examiner—Rina Duda
(74) Attorney, Agent, or Firm—Stanzione & Kim, LLP (57) ABSTRACT

A robot control apparatus to control an operation path of a robot includes an interpolator including a rough interpolation processor to output a rough velocity signal of no-acceleration and no-deceleration according to input commands, a plurality of acceleration/deceleration processors to receive the rough velocity signal from the rough interpolation processor and to perform acceleration and deceleration in sequence, and an inverse kinematics processor to transform the velocity signal received from the acceleration/deceleration processor into a joint velocity signal for the robot, and a controller to control the robot according to the accelerated/decelerated velocity signal received from the interpolator. In a robot control apparatus and a control method thereof, precision about an operation path of a robot is improved.

25 Claims, 9 Drawing Sheets

ROBOT CONTROL APPARATUS AND CONTROL METHOD THEREOF

CROSS-REFERENCE TO RELATED APPLICATIONS

This application claims the benefit of Korean Patent Application No. 2004-71259, filed on Sep. 7, 2004, in the Korean Intellectual Property Office, the disclosure of which is incorporated herein in its entirety and by reference.

BACKGROUND OF THE INVENTION

1. Field of the Invention

The present general inventive concept relates to a robot control apparatus and a control method thereof, and more particularly, to a robot control apparatus and a control method thereof, which comprise a dual acceleration/deceleration processor to control an operation path of a robot.

2. Description of the Related Art

Generally, a robot control apparatus comprises an interpolator to keep an operation path of an industrial robot or the like, and to make the robot operate continuously between respective path modes.

Interpolation can be achieved by a circuit or a software module, which calculates disposition of respective joints provided in the robot at every control period so as to control the robot as a user wants, according to various path modes such as a linear path, a circular path, and a point-to-point path. Such an interpolator comprises an acceleration/deceleration filter, such as a low pass filter, to accelerate or decelerate a motor provided in a joint of the robot.

Such a conventional robot control apparatus is disclosed in Korean Patent Application No. 1997-80191 (U.S. Pat. No. 6,046,564), titled "PATH PLANNING APPARATUS AND METHOD FOR ROBOTS." The conventional path planning apparatus for controlling a robot comprises an interpolator formed by a single low pass filter which receives a velocity profile Va calculated on a basis of a target positioning signal and performs a path interpolation to output a smoothed velocity profile Vb, and a servo controller which receives output of the interpolator and controls acceleration and deceleration of a servo motor. Thus, the conventional path planning apparatus for controlling the robot smoothes the operation of the servo motor through the interpolator formed by the single low pass filter, thereby decreasing damage in the robot.

However, in the conventional robot control apparatus, the interpolator employs the single acceleration/deceleration filter such as the low pass filter, so that a relatively large path error arises with respect to an input command path when the robot continuously operates along various path modes such as the linear path and the circular path.

Figure 1:
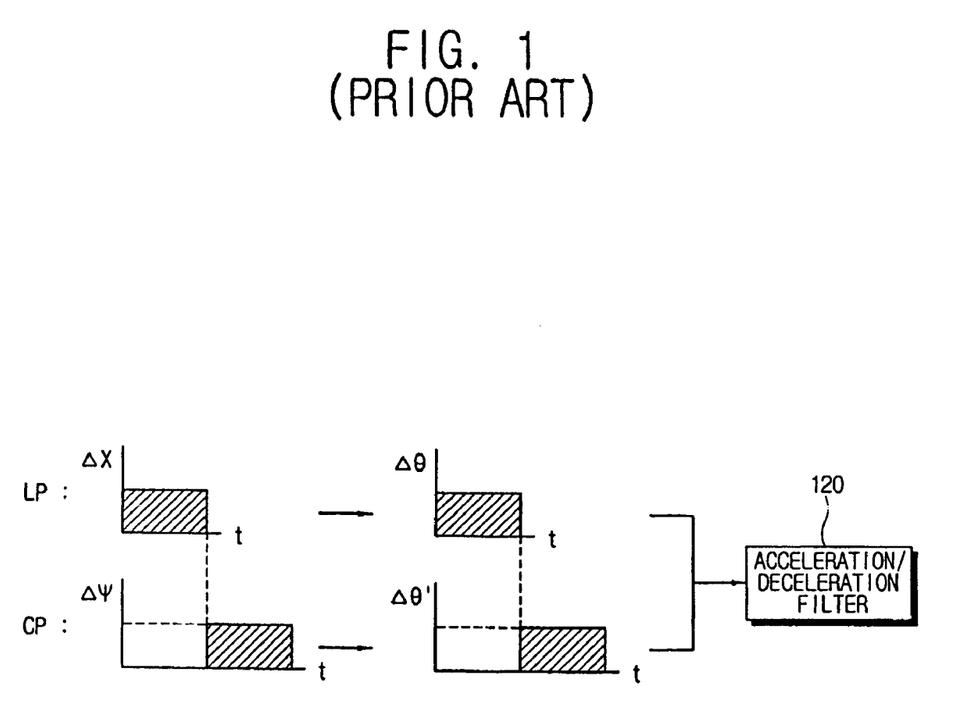
FIG. 1 is a schematic representation of a set of operations of a conventional robot control apparatus.

FIG. 1 is a schematic representation of a set of operations of a conventional robot control apparatus, wherein the conventional robot control apparatus controls a robot to operate along a linear path LP and a circular path CP in sequence.

First, a linear velocity $\Delta X$ and a circumferential angular velocity $\Delta \psi$ are calculated by detecting a positioning signal from an input linear path LP and an input circular path CP. In the case of the linear path LP, the linear velocity $\Delta X$ can be used as an input value of an acceleration/deceleration filter 120. In the case of the circular path CP, the circumferential angular velocity $\Delta \psi$ can be used as the input value of the acceleration/deceleration filter 120. However, the linear velocity $\Delta X$ and the circumferential angular velocity $\Delta \psi$ are different in a dimension, so the linear velocity $\Delta X$ and the circumferential angular velocity $\Delta \psi$ are transformed into joint velocities ($\Delta \theta$, $\Delta \theta'$) through an inverse kinematics process before being inputted to the acceleration/deceleration filter 120 so as to prevent the input values that are different in dimension from interacting with each other in the acceleration/deceleration filter 120. Thus, the transformed joint velocities ($\Delta \theta$, $\Delta \theta'$) are used as the input values of the acceleration/deceleration filter 120, in sequence.

As described above, the conventional robot control apparatus comprises the single acceleration/deceleration filter 120, so the inverse kinematics process (refer to equation 1) should be performed prior to the acceleration/deceleration filter 120 in the case of a continuous operation between the different path modes. At this time, the linear velocity $\Delta X$ is nonlinearly related to the joint velocity $\Delta \theta$ so a relatively large path error arises during an acceleration/deceleration process. For example, the joint velocity $\Delta \theta$ obtained by the inverse kinematics process (refer to equation 1) is accelerated/decelerated by the acceleration/deceleration filter 120, and then a forward kinematics process (refer to equation 2) is used to check whether the accelerated/decelerated joint velocity $\Delta \theta$ is equal to the linear velocity $\Delta X$. As a result of the check, a relatively large path error arises with respect to the input command path.

$$\Delta \theta = J^{-1} \cdot \Delta X \quad \text{(equation 1)}$$

$$\Delta X = J(\theta) \cdot \Delta \theta \quad \text{(equation 2)}$$

Where $J(\theta)$ is a Jacobian matrix.

Thus, the conventional robot control apparatus is in need of an ability to operate the robot without a relatively large path error due to the single acceleration/deceleration filter with respect to an actual path.

SUMMARY OF THE INVENTION

The present general inventive concept provides a robot control apparatus and a control method thereof, which are improved in precision with respect to an operation path of a robot.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a robot control apparatus to control an operation path of a robot, the robot control apparatus comprising an interpolator having a rough interpolation processor to output a rough velocity signal of no-acceleration and no-deceleration according to one or more input commands, a plurality of acceleration/deceleration processors to receive the rough velocity signal from the rough interpolation processor and to perform acceleration and deceleration in sequence, and an inverse kinematics processor to transform velocity signals received from the acceleration/deceleration processors into joint velocity signals for the robot, and a controller to control the robot on a basis of the joint velocity signals received from the interpolator.

The interpolator may further comprise a superposition processor to superpose the respective joint velocity signals transformed by the inverse kinematics processor.

The superposition processor may superpose a deceleration section and an acceleration section of the respective joint velocity signals.

The plurality of acceleration/deceleration processors may comprise a first acceleration/deceleration processor and a second acceleration/deceleration processor.

The first acceleration/deceleration processor may perform the acceleration and the deceleration in sequence on a basis of odd numbered rough velocity signals received from the rough interpolation processor, and the second acceleration/deceleration processor may perform the acceleration and the deceleration in sequence on a basis of even numbered rough velocity signals received from the rough interpolation processor.

The robot control apparatus may further comprise a planner to analyze the one or more input commands about operation of the robot and to output positioning information to the interpolator.

The foregoing and/or other aspects of the present general inventive concept may also be achieved by providing a control method of a robot control apparatus to control an operation path of a robot, the control method comprising outputting a rough velocity signal of no-acceleration and no-deceleration according to input commands, allowing a plurality of acceleration/deceleration processors to receive the rough velocity signal and to perform acceleration and deceleration in sequence, transforming velocity signals received from the acceleration/deceleration processors into joint velocity signals for the robot, and controlling the robot on a basis of the joint velocity signal.

The control method may further comprise superposing the respective joint velocity signals.

The plurality of acceleration/deceleration processors may comprise a first acceleration/deceleration processor and a second acceleration/deceleration processor, and the control method may further comprise allowing the first acceleration/deceleration processor to perform the acceleration and the deceleration in sequence on a basis of odd numbered rough velocity signals, and allowing the second acceleration/deceleration processor to perform the acceleration and the deceleration in sequence on a basis of even numbered rough velocity signals.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
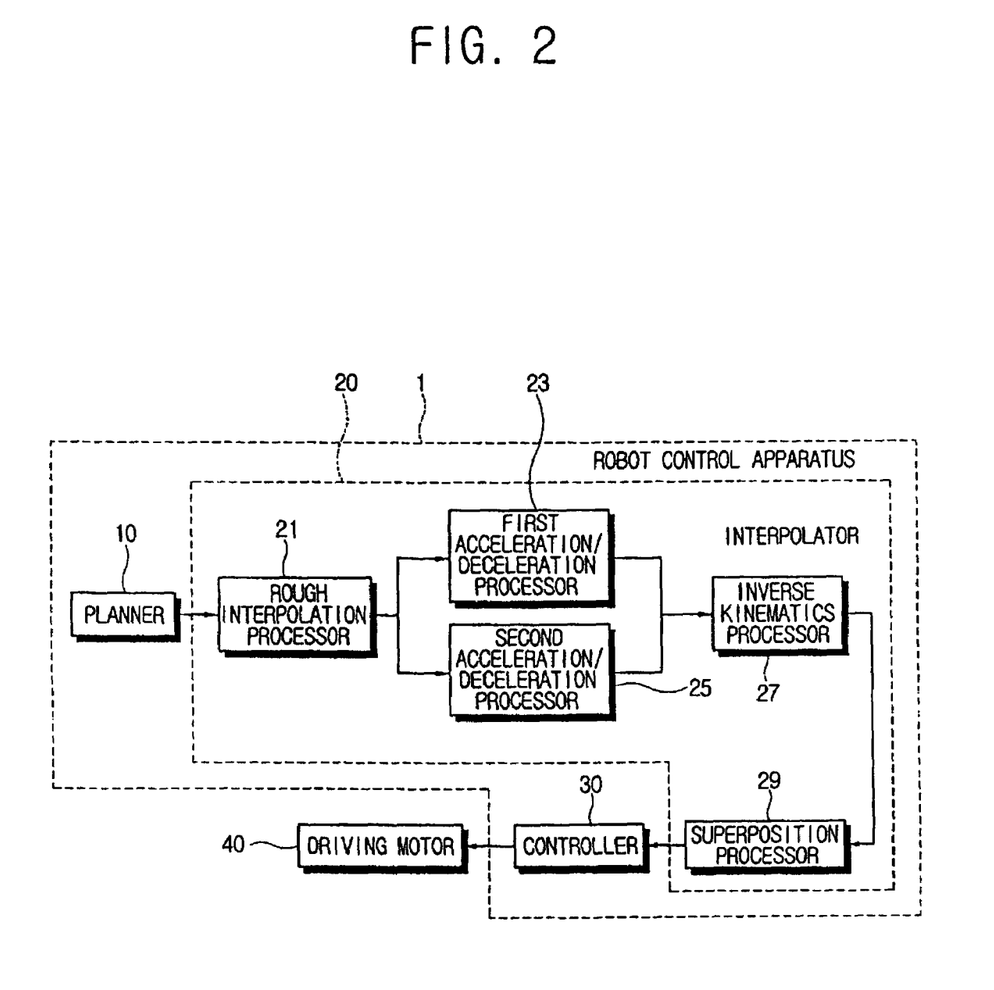
FIG. 2 is a block diagram of a robot control apparatus according to an embodiment of the present general inventive concept.

As shown in FIG. 2, a robot control apparatus 1 according to an embodiment of the present general inventive concept comprises an interpolator 20 to keep an operation path to control a robot (not shown) to move along the operation path and to make the robot operate continuously between respective path modes, and a controller 30 to control the robot on a basis of a signal received from the interpolator 20. Further, the robot control apparatus 1 according to an embodiment of the present general inventive concept comprises a planner 10 to analyze an input command about an operation of the robot and to output positioning information to the interpolator 20.

The planner 10 receives the input command given by a user with regard to the operation path of the robot, and analyzes the input command, thereby transmitting the positioning information or the like to the interpolator 20.

The interpolator 20 comprises a rough interpolation processor 21 to output a rough velocity signal of no-acceleration and no-deceleration according to the positioning information and/or the input command, a plurality of acceleration/deceleration processors 23 and 25 to receive the rough velocity signal of the rough interpolation processor 21 and to perform acceleration and/or deceleration processes (acceleration and deceleration) in sequence, and an inverse kinematics processor 27 to transform velocity signals received from the acceleration/deceleration processors 23 and 25 into joint velocity signals for the robot. Further, the interpolator 20 may comprise a superposition processor 29 to superpose the respective joint velocity signals received by the inverse kinematics processor 27.

The rough interpolation processor 21 receives the positioning information about the operation path of the robot from the planner 10, and outputs the rough velocity signal to the acceleration/deceleration processors 23 and 25. The rough velocity signal outputted from the rough interpolation processor 21 contains a velocity profile having a constant initial velocity and a constant final velocity. Therefore, if the rough velocity signal is directly transmitted to the controller 30, a driving motor 40 provided in a joint of the robot may be damaged.

Each of the acceleration/deceleration processors 23 and 25 may be embodied as an acceleration/deceleration filter such as a low pass filter to accelerate and/or decelerate the driving motor 40 provided in the joint of the robot. However, the acceleration/deceleration processors 23 and 25 are not limited to acceleration/deceleration filters, and may comprise various software programs or the like formulated to accelerate or decelerate the driving motor 40 provided in the joint of the robot. The plurality of acceleration/deceleration processors 23 and 25 comprises a first acceleration/deceleration processor 23 and a second acceleration/deceleration processor 25. The plurality of acceleration/deceleration processors 23 and 25 is not limited to one pair of acceleration/deceleration processors (the first acceleration/deceleration processor 23 and the second acceleration/deceleration processor 25), and may comprise additional acceleration/deceleration processors.

The first acceleration/deceleration processor 23 performs the acceleration and deceleration in sequence with respect to odd numbered rough velocity signals received from the rough interpolation processor 21. That is, the first acceleration/deceleration processor 23 sequentially processes the odd numbered rough velocity signals, such as first, third and fifth rough velocity signals, and so on, received from the rough interpolation processor 21, and then transmits them to the inverse kinematics processor 27.

The second acceleration/deceleration processor 25 performs the acceleration and deceleration in sequence with respect to even numbered rough velocity signals received from the rough interpolation processor 21. That is, the second acceleration/deceleration processor 25 sequentially processes the even numbered rough velocity signals, such as second, fourth and sixth rough velocity signals, and so on, received from the rough interpolation processor 21, and then transmits them to the inverse kinematics processor 27.

The inverse kinematics processor 27 transforms accelerated and decelerated velocity signals received from the first and second acceleration/deceleration processors 23 and 25 into the joint velocity signal of the robot. That is, the inverse kinematics processor 27 transforms the velocity signals about various path modes, such as a linear path, a circular path, and/or a point-to-point path, as a user wants, into the joint velocity signal according to the above-mentioned equation 1, and then transmits the transformed joint velocity signal to the superposition processor 29. Here, the inverse kinematics processor 27 can be formed as a pair corresponding to the first and second acceleration/deceleration processors 23 and 25, or formed as a single inverse kinematics processor, thereby transforming the velocity signal transmitted from the first and second acceleration/deceleration processors 23 and 25 into the joint velocity signal of the robot. Further, the inverse kinematics processor 27 can be configured as hardware to process the accelerated/decelerated velocity signal through an inverse kinematics process, and can be configured as software provided in the interpolator 20 to process the accelerated/decelerated velocity signal through the inverse kinematics.

The superposition processor 29 superposes the joint velocity signals transmitted from the inverse kinematics processor 27, in sequence. The superposition processor 29 superposes a deceleration section of a previously transmitted joint velocity signal and an acceleration section of a subsequently transmitted joint velocity signal. For example, the superposition processor 29 superposes the joint velocity signals to match a start point of the deceleration section of the previously transmitted joint velocity signal with a start point of the acceleration section of the subsequently transmitted joint velocity signal. The superposition processor 29 can superpose the joint velocity signals without being limited to the foregoing method, and may have various alternative methods. The superposition processor 29 can be configured as hardware to superpose the joint velocity signals processed through the inverse kinematics, and/or can be configured as software provided in the interpolator 20 to superpose the joint velocity signals processed through the inverse kinematics.

The controller 30 controls the driving motor 40 of the robot according to a superposed velocity signal received from the superposition processor 29.

With this configuration, operations of the robot control apparatus 1 of FIG. 2 according to an embodiment of the present general inventive concept will be described with reference to FIGS. 3 through 7.

Figure 3:
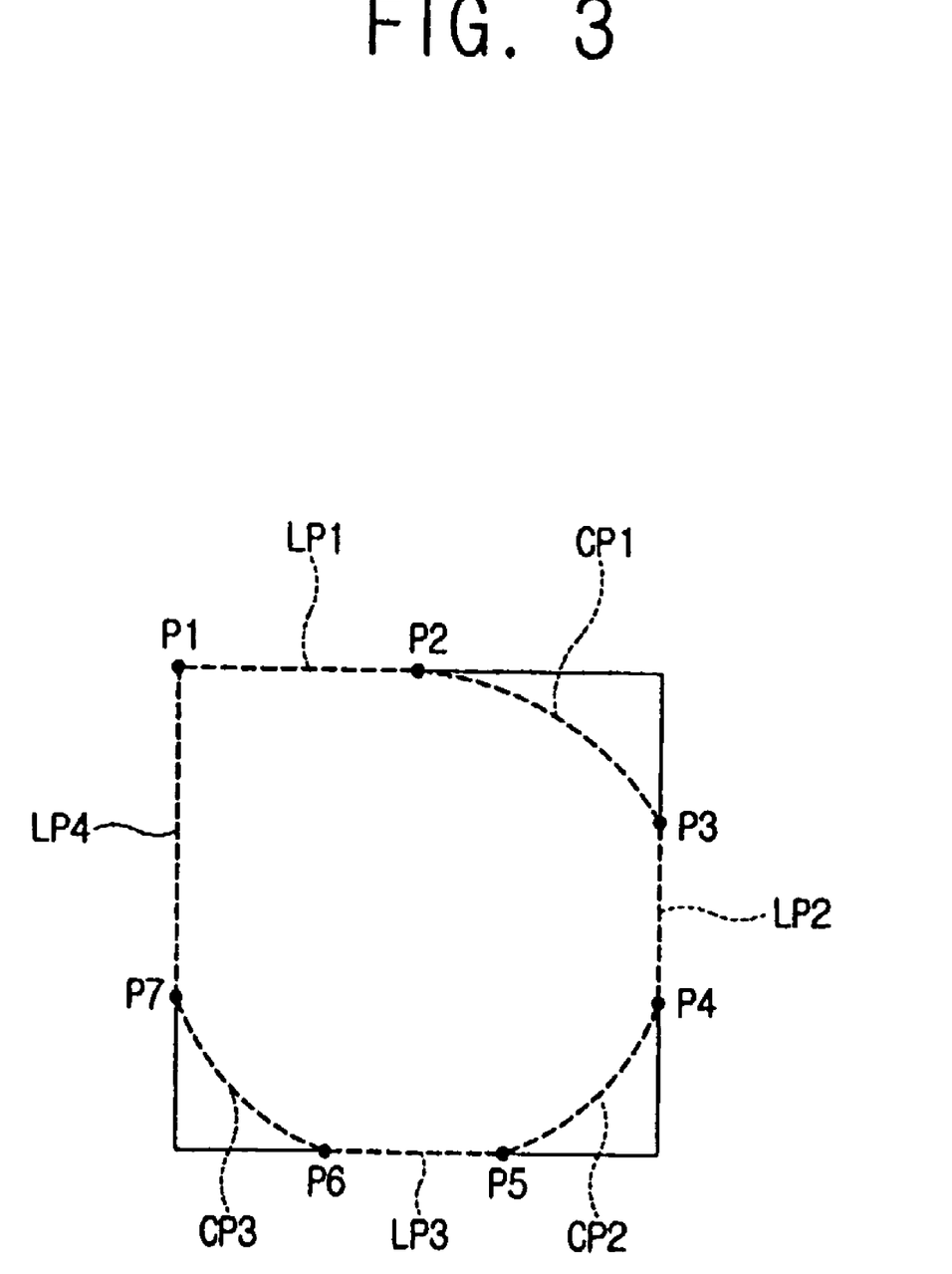
FIG. 3 is a schematic representation of an exemplary path along which the robot control apparatus of FIG. 2 moves.

FIG. 3 is a schematic representation of an exemplary path along with the robot control apparatus 1 of FIG. 2 is supposed to move. As shown in FIGS. 2 and 3, the path (refer to a dotted line of FIG. 3) provided to test the robot control apparatus alternately comprises the linear path (LP1: P1–P2, LP2:P3–P4, LP3:P5–P6, LP4:P7–P1) and the circular path (CP1:P2–P3, CP2:P4–P5, CP3:P6–P7).

Figure 4:
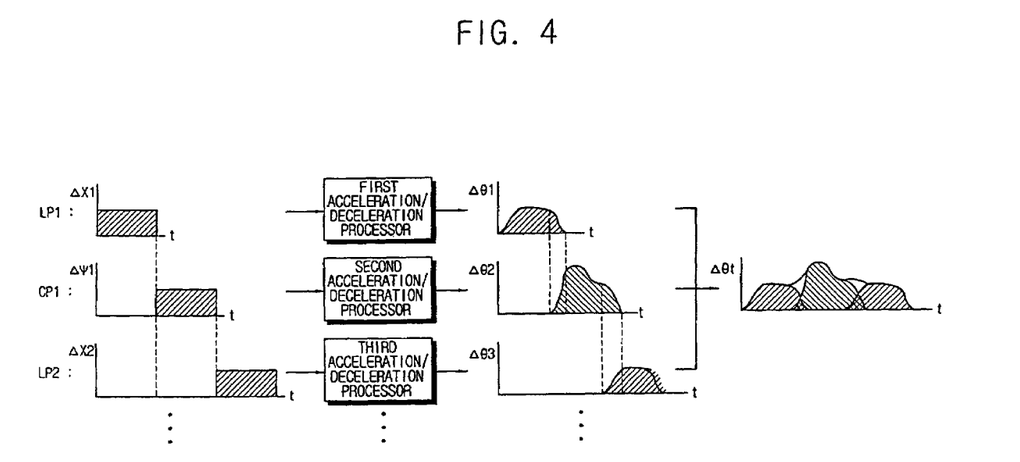
FIG. 4 is a schematic representation of a process of applying a robot control apparatus to the path of FIG. 3 according to an embodiment of the present general inventive concept.
Figure 7:
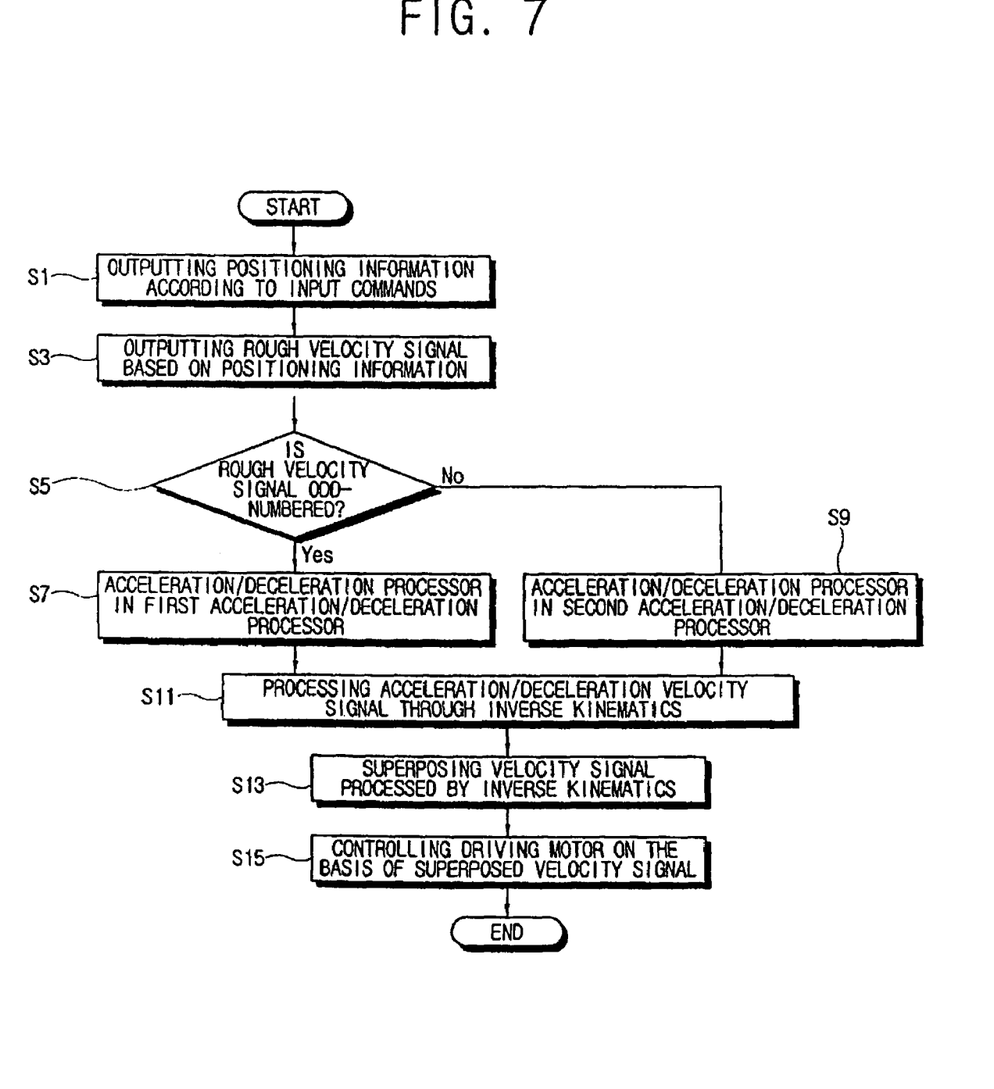
FIG. 7 is a flowchart illustrating a method of a robot control apparatus according to an embodiment of the present general inventive concept.

FIG. 4 is a schematic representation of a process of applying a robot control apparatus to the path of FIG. 3 according to an embodiment of the present general inventive concept. FIG. 7 is a flowchart illustrating a method of a robot control apparatus according to an embodiment of the present general inventive concept.

At operation S1, the planner 10 outputs the positioning information corresponding to the input command given by a user or the like. At operation S3, the rough interpolation processor 21 outputs a first rough linear velocity $\Delta X1$, a rough circumferential angular velocity $\Delta \psi 1$, a second rough linear velocity $\Delta X2$, or the like corresponding to a first linear path LP1, a circular path CP1, and a second linear path LP2. At operation S5, it is checked whether the first rough linear velocity $\Delta X1$, the rough circumferential angular velocity $\Delta \psi 1$, and the second rough linear velocity $\Delta X2$ outputted from the rough interpolation processor 21 are odd-numbered or even-numbered. At operation S7, the odd-numbered rough linear velocities $\Delta X1$ and $\Delta X2$ are transmitted to the first acceleration/deceleration processor 23 and then accelerated/decelerated. At operation S9, the even-numbered rough circumferential angular velocity $\Delta \psi 1$ is transmitted to the second acceleration/deceleration processor 25 and then accelerated/decelerated. At operation S11, the accelerated/decelerated linear velocity and the accelerated/decelerated circumferential angular velocity are transformed by the inverse kinematics processor 27 into the respective joint velocities $\Delta \theta 1$, $\Delta \theta 2$, and $\Delta \theta 3$. At operation S13, the transformed joint velocities $\Delta \theta 1$, $\Delta \theta 2$, and $\Delta \theta 3$ are superposed and transformed by the superposition processor 29 into a superposition velocity $\Delta \theta t$. At operation S15, the superposition velocity $\Delta \theta t$ is transmitted to the controller 30, thereby controlling the driving motor 40.

Figure 5A:
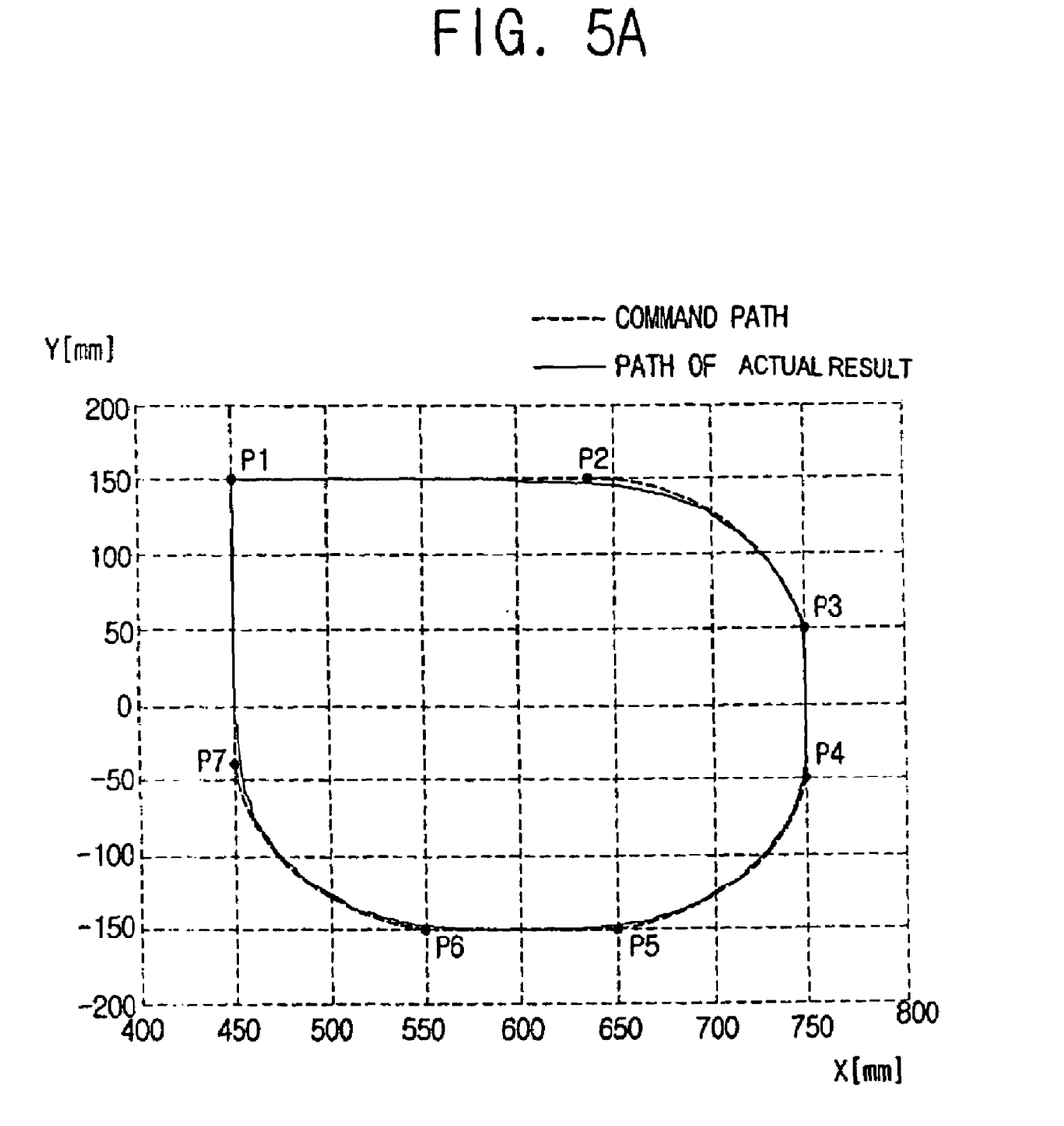
FIGS. 5A and 5B are schematic representations of actual paths obtained by applying the robot control apparatus of FIG. 2 and a conventional robot control apparatus to the path of FIG. 3 on a basis of a forward kinematics, respectively.
Figure 5B:
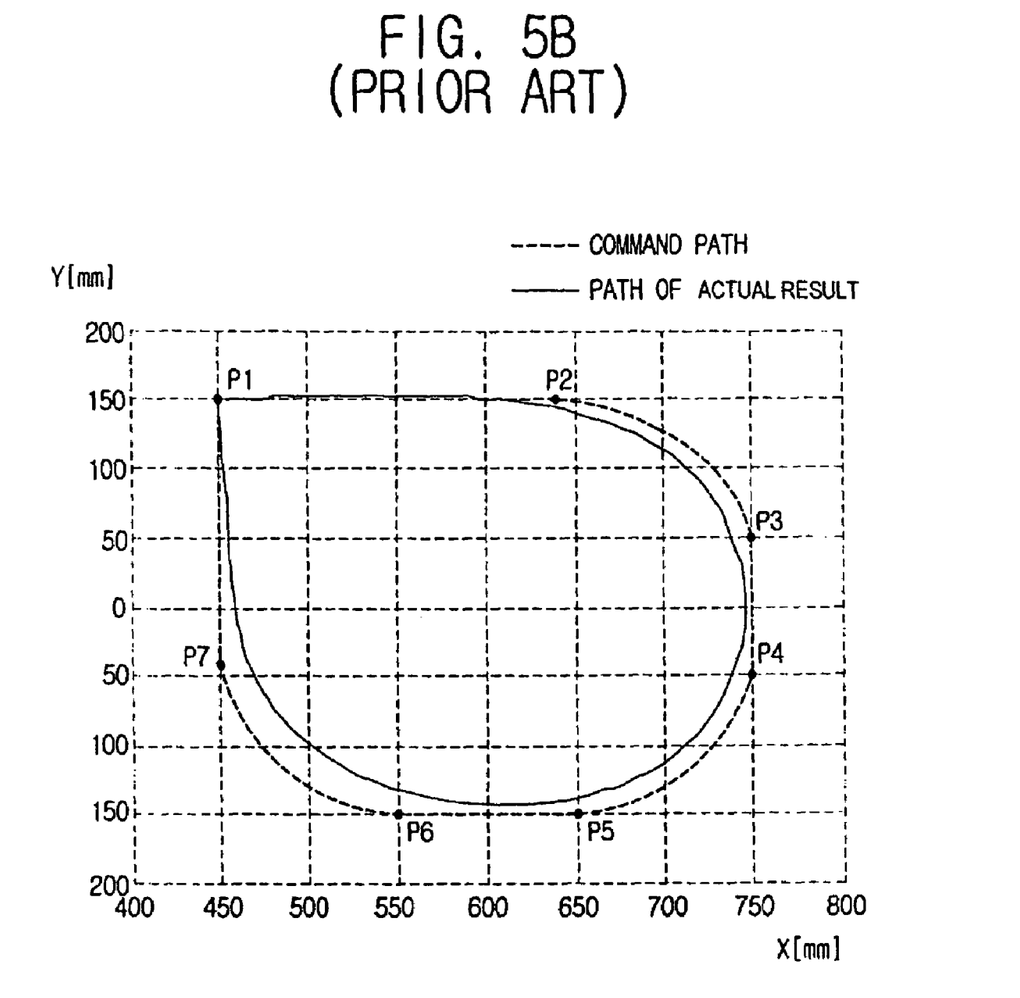
Figure 6A:
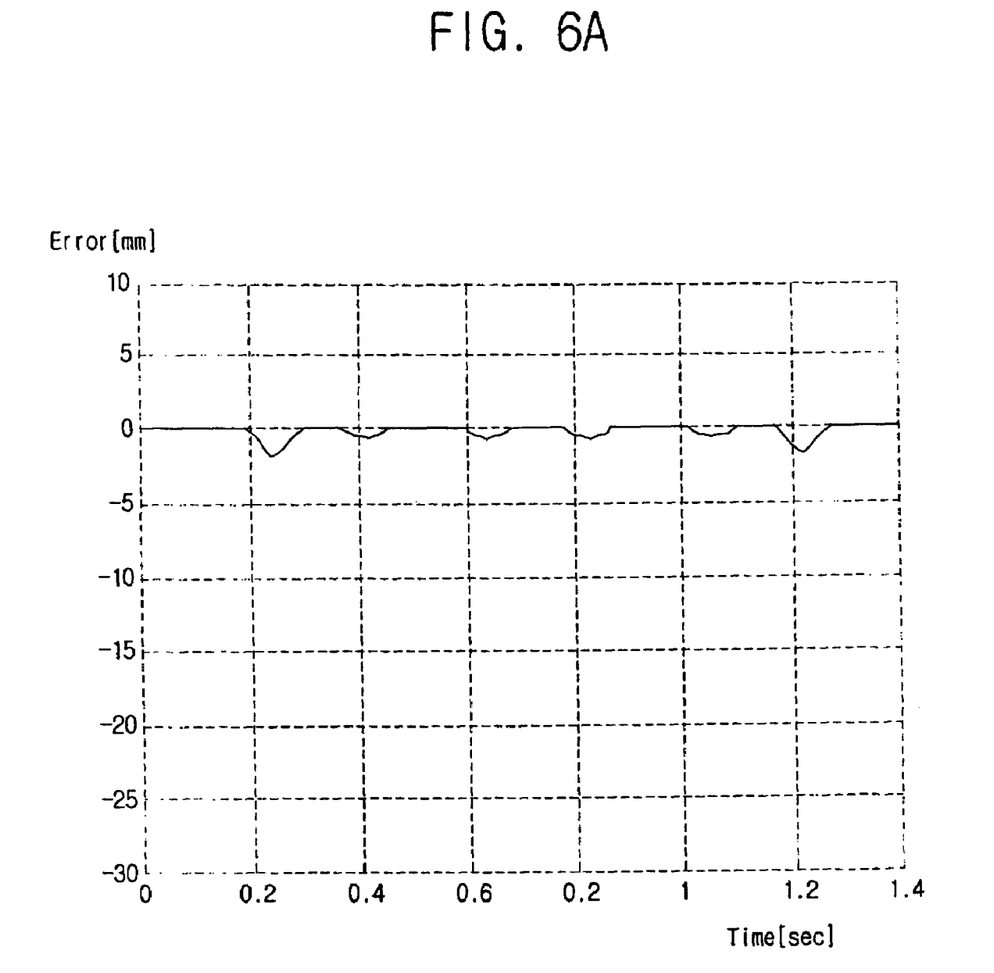
FIGS. 6A and 6B are schematic representations of path errors of the paths of FIGS. 5A and 5B, respectively.
Figure 6B:
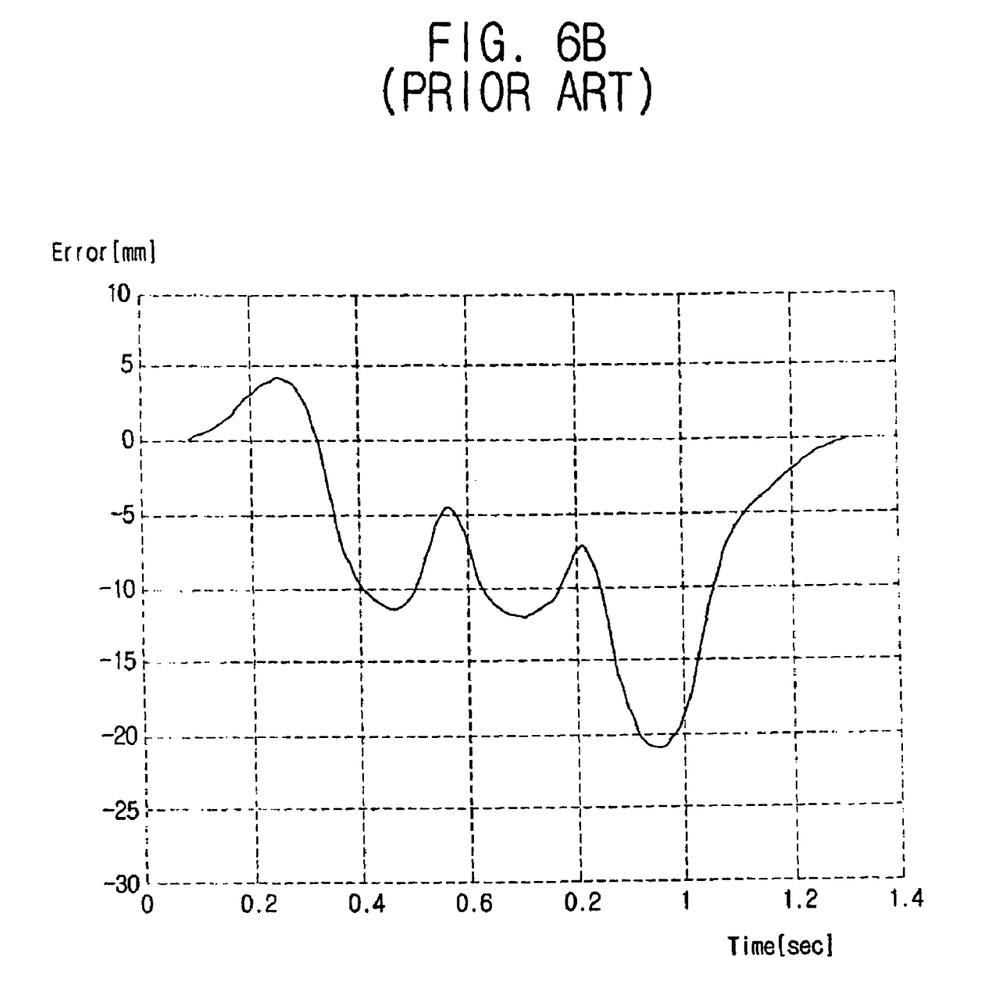

FIGS. 5A and 5B are schematic representations of actual paths obtained by applying the robot control apparatus of FIG. 2 and a conventional robot control apparatus having a single acceleration/deceleration filter to the paths (refer to dotted lines of FIGS. 3, 5A and 5B) on a basis of a forward kinematics, respectively. As shown therein, FIG. 5A is a schematic representation of a path of an actual result obtained by the robot control apparatus of FIG. 2 to perform the foregoing operation (refer to a solid line of FIG. 5A). FIG. 5B is a schematic representation of a path of an actual result obtained by the conventional robot control apparatus comprising the single acceleration filter to perform the inverse kinematics before a process of the acceleration/deceleration filter (refer to a solid line of FIG. 5B). FIGS. 6A and 6B are schematic representations of path errors of the paths of FIGS. 5A and 5B, respectively. The test illustrated in FIGS. 5A, 5B, 6A and 6B was performed under the conditions of a path moving velocity of 1000 millimeters per second (mm/sec), an acceleration/deceleration time of 320 milliseconds (msec), and an interpolation period of 4 msec. As shown in FIGS. 6A and 6B, the robot control apparatus 1 according to an embodiment of the present general inventive concept has a maximum path error of 2 mm, while the conventional robot control apparatus has a maximum path error of 22 mm. The robot control apparatus 1 according to an embodiment of the present general inventive concept enhances precision about an operation path of a robot as compared with a conventional robot control apparatus.

A robot control apparatus according to an embodiment of the present general inventive concept comprises a plurality of acceleration/deceleration processors to process an accelerated/decelerated velocity signal on a basis of inverse kinematics, thereby enhancing the precision of an operation path of a robot joint.

As described above, the present general inventive concept provides a robot control apparatus and a control method thereof, which is improved in precision about an operation path of a robot.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A robot control apparatus to control an operation path of a robot, the robot control apparatus comprising:
    an interpolator comprising:
        a rough interpolation processor to output one or more rough velocity signals according to input commands;
        a plurality of acceleration/deceleration processors to receive corresponding ones of the rough velocity signals from the rough interpolation processor and to perform acceleration and deceleration processes in sequence to output one or more velocity signals; and
        an inverse kinematics processor to transform the one or more velocity signals received from the plurality of acceleration/deceleration processors into one or more joint velocity signals for the robot; and
    a controller to control the robot on a basis of the joint velocity signals received from the interpolator.

2. The robot control apparatus according to claim 1, wherein the interpolator further comprises:
    a superposition processor to superpose the respective joint velocity signals transformed by the inverse kinematics processor.

3. The robot control apparatus according to claim 2, wherein the superposition processor superposes a deceleration section and an acceleration section of the respective joint velocity signals.

4. The robot control apparatus according to claim 1, wherein the plurality of acceleration/deceleration processors comprises:
    a first acceleration/deceleration processor; and
    a second acceleration/deceleration processor.

5. The robot control apparatus according to claim 4, wherein the one or more rough velocity signals comprises odd numbered rough velocity signals and even numbered rough velocity signals, and the first acceleration/deceleration processor performs the acceleration and the deceleration processes in sequence with respect to the odd numbered rough velocity signals received from the rough interpolation processor, and
    the second acceleration/deceleration processor performs the acceleration and the deceleration processes in sequence with respect to the even numbered rough velocity signals received from the rough interpolation processor.

6. The robot control apparatus according to claim 1, further comprising:
    a planner to analyze the one or more input commands about an operation of the robot and to output positioning information to the interpolator.

7. The robot control apparatus according to claim 1, wherein the one or more rough velocity signals are free of acceleration and deceleration.

8. The robot control apparatus according to claim 1, wherein the one or more rough velocity signals comprise a constant initial velocity and a constant final velocity.

9. A robot control interpolator used with a robot control apparatus, comprising:
    a first acceleration/deceleration processor to receive a first rough velocity signal, and to perform acceleration and deceleration processes to the first rough velocity signal to provide a first velocity signal;
    a second acceleration/deceleration processor to receive a second rough velocity signal, and to perform acceleration and deceleration processes to the second rough velocity signal to provide a second velocity signal; and
    an inverse kinematics processor to transform the velocity signals received from the first and second acceleration/deceleration processors into first and second joint velocity signals for a robot, respectively.

10. The robot control interpolator according to claim 9, further comprising:
    a rough interpolation processor to output the first and second rough velocity signals according to at least one input command.

11. The robot control interpolator according to claim 9, further comprising:
    a superposition processor to superpose the joint velocity signals transformed by the inverse kinematics processor.

12. The robot control interpolator according to claim 11, wherein the superposition processor superposes a deceleration section and an acceleration section of the respective joint velocity signals.

13. The robot control interpolator according to claim 11, wherein the first joint velocity signal comprises a first acceleration section and a first deceleration section, the second joint velocity signal comprises a second acceleration section and a second deceleration section, and the superposition processor superposes the first acceleration section of the first joint velocity signal and the second acceleration section of the second joint velocity signal.

14. The robot control interpolator according to claim 11, wherein the first rough velocity signal comprises odd numbered rough velocity signals, the second rough velocity signal comprises even numbered rough velocity signals, and the first acceleration/deceleration processor performs the acceleration and the deceleration processes in sequence with respect to the odd numbered rough velocity signals received from the rough interpolation processor, and
    The second acceleration/deceleration processor performs the acceleration and the deceleration processes in sequence with respect to the even numbered rough velocity signals received from the rough interpolation processor.

15. The robot control interpolator according to claim 9, wherein the first joint velocity signal comprises a deceleration section, the second joint velocity signal comprises an acceleration section, and start points of the deceleration section of the first joint velocity signal and the acceleration section of the second joint velocity signal are controlled to match.

16. A control method of a robot control apparatus to control an operation path of a robot, the control method comprising:
    outputting one or more rough velocity signals according to one or more input commands;
    allowing a plurality of acceleration/deceleration processors to receive the one or more rough velocity signals and to perform acceleration and deceleration processes in sequence, and to output one or more velocity signals;

transforming the one or more velocity signals received from the plurality of acceleration/deceleration processors into a joint velocity signal for the robot; and controlling the robot according to the joint velocity signal.

17. The control method according to claim 16, wherein the joint velocity signal comprises first and second joint velocity signals corresponding to the one or more velocity signals, and the transforming the one or more velocity signals comprises superposing the first and second joint velocity signals as the joint velocity signal.

18. The control method according to claim 16, wherein the allowing of the plurality of acceleration/deceleration processors to receive the one or more rough velocity signals comprises:

allowing the first acceleration/deceleration processor to perform the acceleration and the deceleration processes in sequence with respect to odd numbered rough velocity signals, and allowing the second acceleration/deceleration processor to perform the acceleration and the deceleration processes in sequence with respect to even numbered rough velocity signals.

19. The control method according to claim 16, wherein the rough velocity signal is free of acceleration and deceleration.

20. The control method according to claim 16, wherein the rough velocity signal comprises a constant initial velocity and a constant final velocity.

21. A method to control an operation path of a robot, the control method comprising:

receiving a first rough velocity signal in a first acceleration and/or deceleration processor;

performing acceleration and/or deceleration processes to the first rough velocity signal to provide a first velocity signal;

receiving a second rough velocity signal in a second acceleration and/or deceleration processor;

performing acceleration and/or deceleration processes to the second rough velocity signal to provide a second velocity signal; and transforming the first and second velocity signals into first and second joint velocity signals for a robot, respectively.

22. The method according to claim 21, further comprising:

superposing a deceleration section of the first joint velocity signal over an acceleration section of the second joint velocity signal.

23. The method according to claim 21, wherein:

the operation of performing acceleration and deceleration processes to the first rough velocity signal comprises, determining whether a number associated with the first rough velocity signal is an odd number, and if so, performing the first acceleration and/or deceleration processes using a first acceleration/deceleration processor to provide the first velocity signal; and the operation of performing acceleration and/or deceleration processes to the second rough velocity signal comprises, determining whether a number associated with the second rough velocity signal is an even number, and if so, performing the second acceleration and/or deceleration processes using a second acceleration/deceleration processor to provide the second velocity signal.

24. The method according to claim 21, wherein the first joint velocity signal comprises a first acceleration section and a first deceleration section, the second joint velocity signal comprises a second acceleration section and a second deceleration section, and wherein the method further comprises superposing the first acceleration section of the first joint velocity signal and the second acceleration section of the second joint velocity signal.

25. The method according to claim 21, wherein the first rough velocity signal comprises a linear velocity, and wherein the second rough velocity signal comprises a circumferential angular velocity.

* * * * *